May 14, 1929.  A. W. FREHSE  1,712,954
FRONT WHEEL BRAKE
Filed Dec. 14, 1927   2 Sheets-Sheet 2

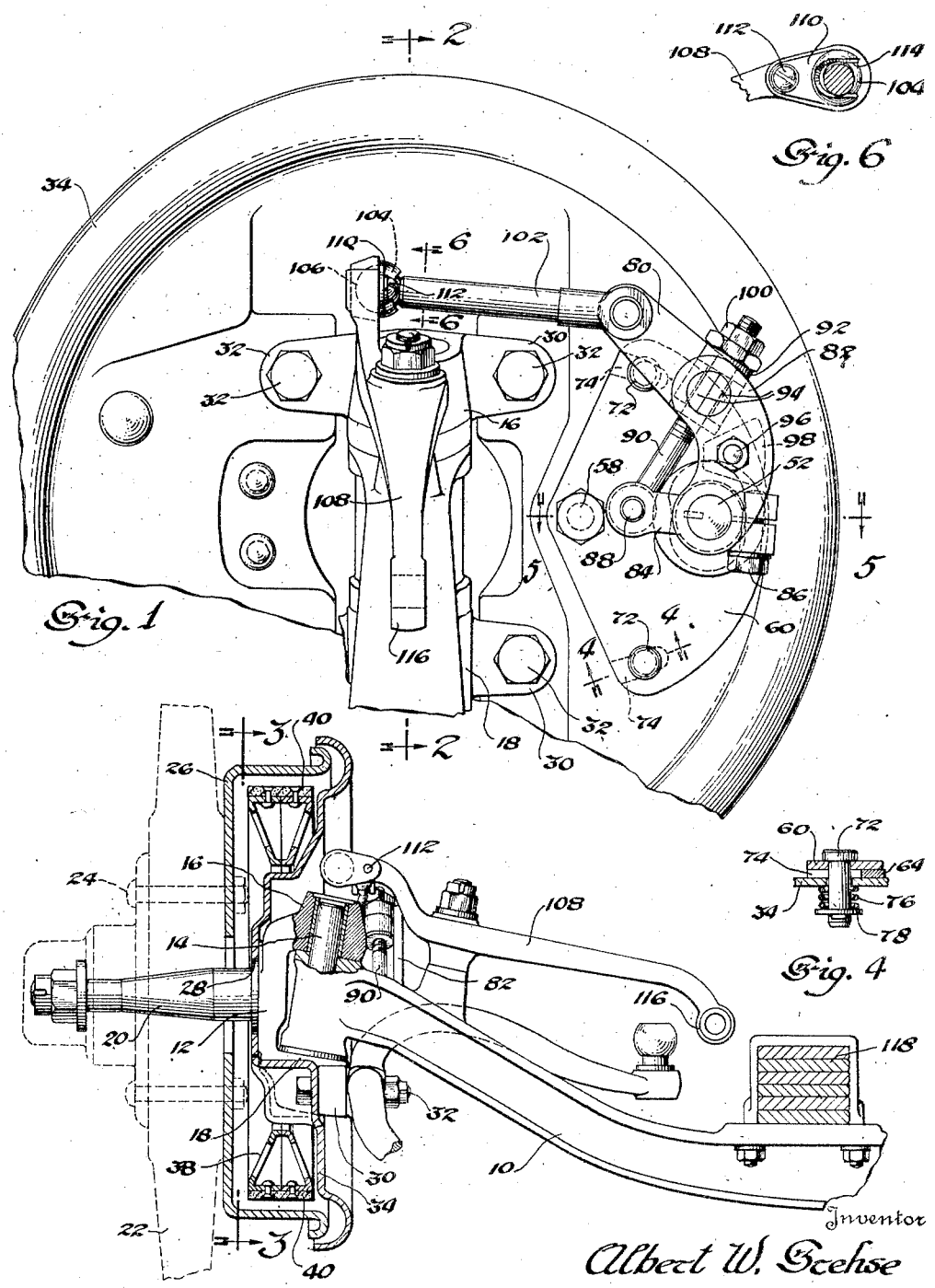

Inventor
Albert W. Frehse
By Blackmore, Spencer & Hish
Attorney

Patented May 14, 1929.

1,712,954

UNITED STATES PATENT OFFICE.

ALBERT W. FREHSE, OF DETROIT, MICHIGAN, ASSIGNOR TO GENERAL MOTORS CORPORATION, OF DETROIT, MICHIGAN, A CORPORATION OF DELAWARE.

FRONT-WHEEL BRAKE.

Application filed December 14, 1927. Serial No. 239,956.

My invention relates to internal brakes and more particularly to such brakes designed for use on the front wheels of motor vehicles.

The principal object is to provide an internal front wheel brake in which the pressure of the operating cam against the shoes may be equalized at all times to compensate for movement of the shoes due to self actuation and for unequal wear of the brake lining. This is accomplished by allowing the cam to float between the ends of the shoes. By arranging the connection between the cam and the brake operating lever in a particular manner, this cam may move a comparatively large distance back and forth between the shoes regardless of the amount of pressure being applied by the operating lever.

A second object is to provide such a brake in which an adjusting mechanism is arranged on the outside of the drum in an accessible location, to permit adjustment of the amount of movement necessary to actuate the brake, and which may be adjusted without disturbing the above described relation of the brake operating mechanism.

Another object is to provide such a brake in which the operating levers are arranged with respect to the swivelling axis of the front wheel in such a manner that when the brake is in applied position, it will not be affected materially by the steering movement of the wheel.

The above and other objects will be more readily understood upon referring to the specification and accompanying drawing, in which:

Fig. 1 is a fragmentary view taken from the center of the vehicle and looking toward the inside of the left front wheel, showing my improved brake operating mechanism in connection therewith.

Fig. 2 is a view taken on the line 2—2 of Fig. 1, showing the construction partly in section and partly in elevation.

Fig. 4 is a section taken on the line 4—4 of Fig. 1.

Fig. 6 is a section taken on the line 6—6 of Fig. 1.

Figures 3, 5, 7:
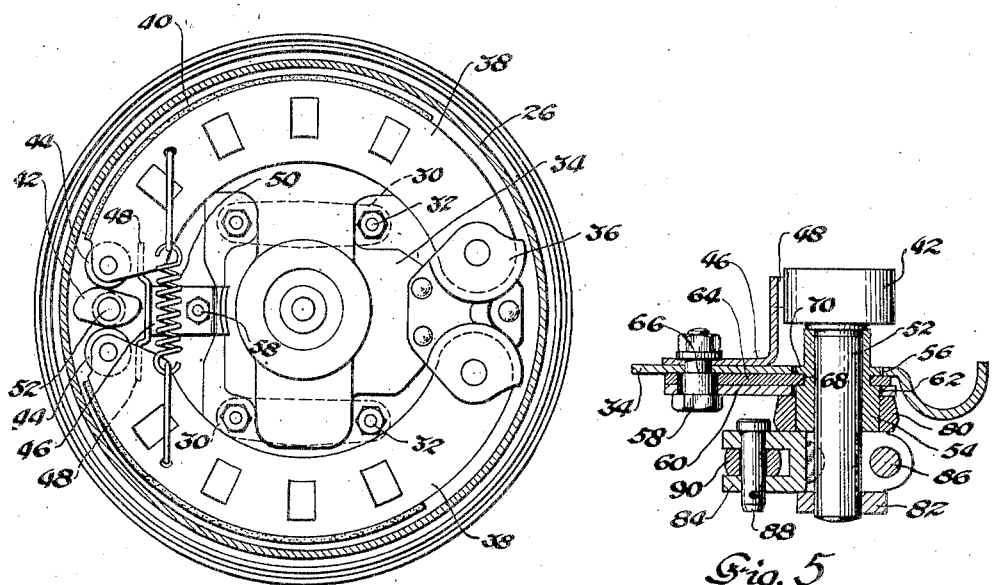
Fig. 3 is a view taken from the outside of the vehicle, showing the brake with the wheel removed.
Fig. 5 is a section taken on the line 5—5 of Fig. 1.
Fig. 7 is a detail perspective view of part of the adjusting mechanism.

The reference numeral 10 indicates the front axle of a motor vehicle on which is swivelled a steering knuckle 12 by means of a king pin 14 passing through aligned openings in the end of the axle and in the knuckle arms 16 and 18. The steering knuckle is formed with the usual stub axle 20 for the front wheel 22. Secured to the inner side of the wheel by bolts 24 is a brake drum 26. Piloted upon a shoulder 28 and drawn against bosses 30 on the knuckle by bolts 32, is a backing plate 34. It will be seen that this plate will turn with the knuckle when the wheel is swivelled in steering the vehicle. Riveted to this backing plate is a pressed metal member 36 which serves as an anchor to support the brake shoes 38 as shown in Fig. 3. Brake lining 40 is secured to the shoes and is moved into engagement with the drum by a cam 42 which may be urged against rollers 44 in the ends of the shoes.

Adjacent the ends of the shoes engaged by the cam is a plate 46 secured to the backing plate and formed with wings 48 which fit into openings in the ends of the shoes to prevent transverse movement of the latter, while freely permitting the movement of the shoes to and from brake applying position. The shoes are normally held away from the drum by the tension spring 50 which pulls the shoes toward each other so that the rollers are always bearing against the cam.

Referring to Fig. 5, the cam 42 is secured to the end of a shaft 52 which is journalled in a sleeve 54 which passes through an elongated opening 56 in the backing plate. Secured to the backing plate by a bolt 58, is a stationary plate 60 having an elongated opening 62 through which the sleeve 54 passes. Pivotally mounted upon the bolt 58 between the stationary plate 60 and the backing plate is a slidable plate 64. The bolt 58 is formed with a shoulder 66 which prevents drawing the stationary plate 60 down tightly against the slidable plate 64. The sleeve 54 is assembled in the slidable plate 64 by inserting the end which is adjacent the cam, through the opening in the slidable plate until the latter abuts against the shoulder 68, after which the sleeve is pressed through a die and a flange 70 is upset upon it, for the purpose of preventing rotation of the sleeve and also to prevent squeezing the slidable plate between the backing plate and the stationary plate.

As shown in Fig. 4, pins 72 pass through holes in the backing plate and the stationary plate and through slots 74 and the slidable plate 64. Compression springs 76 between the backing plate and washers 78 on the pins, serve to pull the stationary plate 60 up against the slidable plate 64 just tightly enough to permit the latter to move only when the brakes are applied, when the cam may swing in an arc about the center of the bolt 58 to exert the same amount of pressure against both shoes. This floating movement is necessary because in the form of brake shown due to the location of the brake anchor, when the brake is applied one of the shoes is pulled outward into tighter engagement with the drum, by the rotation of the latter, and the other shoe is pulled inward. This is what is referred to as self-actuation of the brakes. It is to permit this movement that the cam is arranged so that it can float back and forth. The floating of the cam also compensates for unequal wear of the brake linings on the two shoes.

Journalled on the sleeve 54 is a long arm 80 and journalled on the shaft 52 is a short arm 82. A yoke member 84 is keyed to the shaft 52 between the long and short arms and is clamped thereon by the bolt 86. Pivotally connected to this yoke member by a pin 88 is an adjusting rod 90 on which is threaded an adjusting member 92 which is held between the long and short arms by two half trunnion members 94 in which the adjusting member is free to be rotated. These trunnion members are rotatably held in holes in the long and short arms and the whole assembly is held together by a bolt 96 which passes through and draws the long and short arms together, there being a spacer 98 between them. To adjust the position of the cam with respect to the arms 80 and 82 to take up for wear of the brake linings, it is merely necessary to rotate the adjusting member 92 to the desired position after which it may be locked in that position by the lock nut 100. It will be readily seen that the angular position of the cam with respect to the shoes may be changed without disturbing the position of the arms 80 and 82 which are arranged in a definite relation with respect to the rest of the brake operating mechanism for a purpose to be described later.

Pivotally connected to the outer end of the long arm 80 is a link 102 having at its opposite end a ball 104 which fits into a socket 106 formed in the outer end of a brake operating lever 108 pivoted on the axle 10. The ball end of this link is held in the socket by a spherically shaped stamping 110 secured to the lever 108 by a screw 112. This stamping is provided with a U-shaped slot 114 to allow it to slip over the link 102 when being assembled. The opposite end 116 of the lever has connected to it a brake operating rod or cable.

The center of the ball 104 is so located with respect to the axle that when the brake is applied, the center will be substantially over the king pin and in line with the swiveling axis of the wheel. This, of course, permits the wheel to be turned in steering, when the brake is applied, without materially affecting the braking pressure.

One of the particular advantages of my construction is that the cam may float back and forth between the brake shoes to equalize the pressure on them, even though the maximum amount of braking pressure is being applied through the cam. This is accomplished by the use of the link 102 and by properly locating this link with respect to the arm 80. It will be readily seen that as the cam swings about the bolt 58, shaft 52 with this arm will tend to swing bodily about the same point, but since the outer end of the arm is connected to the link 102 and the latter must swing about the center of the ball and socket joint, the outer end of the arm 80 will travel in substantially a vertical line, or at right angles to the axis of the link 102. This will make the path of movement of the shaft 52 substantially parallel with the path of movement of the point of connection between the arm 80 and the link 102 and consequently the shaft 52 together with the arm 80 may swing freely without their swinging movement being restricted by the link 102 even though the brake is being firmly applied. Obviously the angularity of the cam with respect to the shoes will not be changed, as the shaft 52 may rotate freely in the sleeve 54 when the cam swings in an arc about the center of the bolt 58. If the point of connection of the arm 80 and the link 102 did not swing in an arc substantially at right angles to the axis of the link and parallel with the path of movement of the shaft 52, the floating movement of the cam would be hindered by the arm 80 tending to swing into the link 102. This, of course would not permit the cam to float freely in either direction as it should in a brake of the self-actuating type.

It has been found when using front wheel brake constructions in which the braking force was transmitted from the axle to the frame through the springs, that when the brakes are applied there is a tendency for the springs to twist about an axis transverse to the fore and aft axis of the frame. The axle being rigidly connected with the springs is also caused to twist or rock, thus changing slightly the relation between the axle and the frame. This relative movement is enough to noticeably affect the pressure of the shoes against the drum. The center of this swinging movement of the axle has been found to be substantially in an axis opposite the top of the spring 118 and I prefer to locate the end 116 of the operating lever substantially in this axis, so as to minimize this movement.

Figure 8:
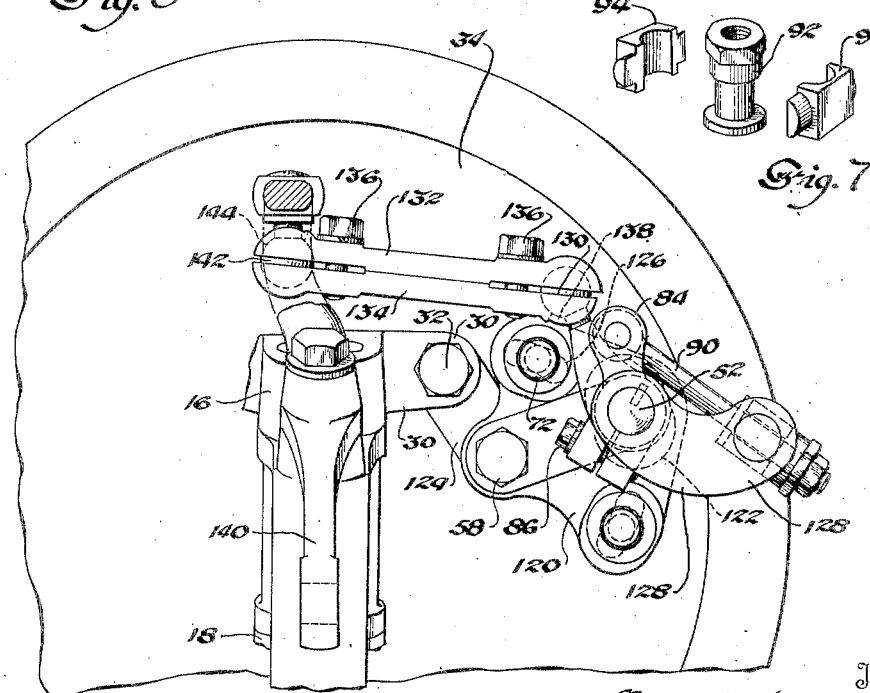
Fig. 8 is a view corresponding to Fig. 1, but showing a modified form of operating mechanism.

Fig. 8 shows a modified form of cam supporting and operating means. The cam shaft 52 is rotatably mounted in a support 120 which extends through an elongated opening 122 in the backing plate 34. This support is pivoted on the bolt 58 which is secured in the backing plate, there being a reinforcement 124 between the support and the backing plate. This reinforcement is clamped between the backing plate and the boss 30 and the bolt 32 passes through it. Pins 72 pass through slots 126 in the support and through the backing plate and springs 76, as shown in Fig. 4, are provided on the inside of the backing plate to pull the support snugly against the backing plate to prevent it from sliding too freely. The same adjusting mechanism is provided as in the form shown in Fig. 1, the only difference being that the trunnion members 94 are pivoted in one end of the long arm 127 and the short arm 128, and the shaft 52 passes through the middle of the long arm 127. At the opposite end of the long arm 127 a ball 130 is provided and this ball is clamped in a socket formed in two link members 132 and 134, which are held together by bolts 136. The link member 134 is provided with a slot 138 through which the end of the long arm 126 adjacent the ball passes to permit angular movement between the link member and the arm. Pivoted on the axle 10 is a brake operating lever 140 which extends up over the king pin and in which is secured a ball member 142 which extends downwardly. This ball member is also clamped between the link members 132 and 134 in sockets formed in them. A slot 144 is provided in the end of the link member 132 through which the shank of the ball member 142 passes. The operation of this form of brake operating mechanism is substantially the same as that of the form shown in Fig. 1.

It is thought from the foregoing taken in connection with the accompanying drawing, that the construction and operation of the mechanism will be apparent to those skilled in the art, and that various changes in size, shape, proportion and details of construction may be made without departing from the spirit and scope of the appended claims.

I claim:

1. Steering wheel brake mechanism comprising, a brake drum, internal brake shoes, a floating cam adapted to force said shoes evenly into engagement with said drum, an arm adapted to actuate said cam, an axle on which the steering wheel is swivelled, a brake operating lever pivoted on the axle, and a link connecting the operating lever with the arm, the arrangement of the arm and the link relative to the lever being such that when the brake is applied the cam may freely float back and forth between the shoes in order to bear evenly against them and such that the joint between the link and the lever will be substantially in the swivelling axis when the brake is applied.

2. Steering wheel brake mechanism comprising, a brake drum, internal brake shoes, a floating cam adapted to force said shoes evenly into engagement with said drum, an arm adapted to actuate said cam, an axle on which the steering wheel is swivelled, a brake operating lever pivoted on the axle, a link connecting said lever with said arm, and a ball and socket joint between said lever and said link arranged to be substantially in the swivelling axis when the brake is applied in order that the swivelling movement of the steering wheel will not affect the braking pressure, and in order that the cam may freely float back and forth between the shoes to bear evenly against them without encountering resistance caused by the brake operating mechanism.

3. Steering wheel brake mechanism comprising, a brake drum, a steering knuckle, a brake backing plate secured to said knuckle, internal brake shoes anchored on said plate, a floating cam adapted to force said shoes evenly into engagement with said drum, said cam being pivoted on said plate, an arm adapted to actuate said cam, adjusting mechanism interposed between said cam and said arm to compensate for wear of said shoes, an axle on which the steering wheel is swivelled, a brake operating lever pivoted on said axle, a link connecting said lever with said arm, and a ball and socket joint between said lever and said link arranged to swing substantially into the swivelling axis of the steering wheel when the brake is applied.

4. Steering wheel brake mechanism comprising a brake drum, internal brake shoes, a floating cam adapted to force said shoes evenly into engagement with said drum, an arm adapted to actuate said cam, an axle on which the steering wheel is swivelled, a brake operating lever pivoted on the axle, and a link connecting said lever to said arm, the arrangement of the brake operating mechanism being such that when the brake is applied the pressure of the shoes against the drum will not be materially affected by the swivelling movement of the steering wheel and such that the cam may freely float back and forth between the shoes to bear evenly against them independently of the degree of application of the braking pressure being applied by the operating mechanism.

5. Steering wheel brake mechanism comprising, a brake drum, internal brake shoes, a floating cam adapted to force said shoes into engagement with said drum, an arm adapted to actuate said cam, an axle on which the steering wheel is swivelled, a brake operating lever pivoted on said axle, a link connecting said operating lever with said arm, the point of connection of said operating lever and said link being substantially in the swivelling axis of the steering wheel when the brake is in applied position, and the opposite end of the operating lever being substantially in the axis of rocking of said axle caused by the brake application.

In testimony whereof I affix my signature.

ALBERT W. FREHSE.